Sept. 24, 1935. J. W. GENUIT 2,015,471
PLANT PROTECTOR
Filed July 25, 1934
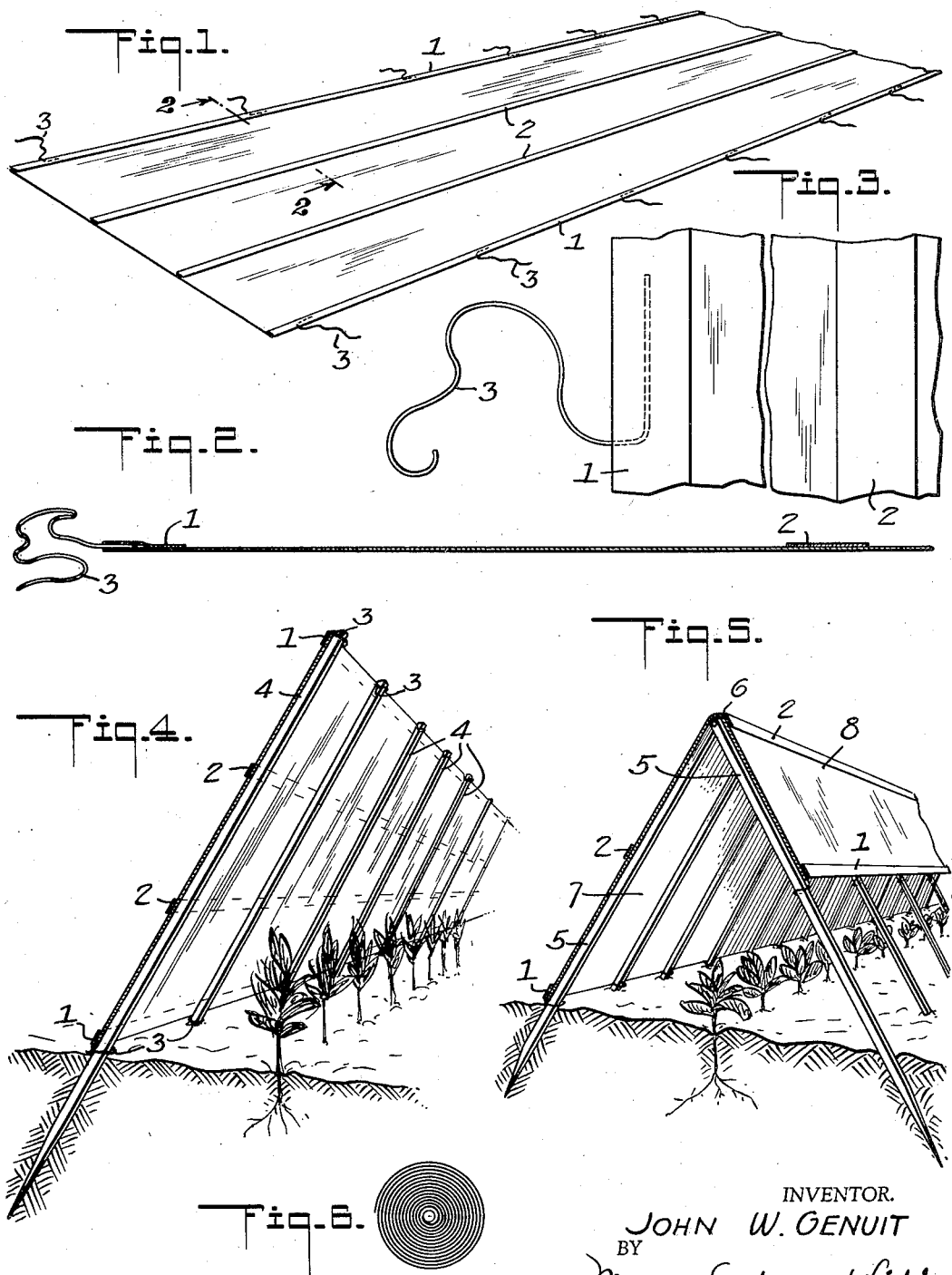
INVENTOR.
JOHN W. GENUIT
BY
Meuen, Anderson + Liddy
ATTORNEYS.

Patented Sept. 24, 1935

2,015,471

UNITED STATES PATENT OFFICE 2,015,471

PLANT PROTECTOR

John W. Genuit, Huntington Park, Calif., assignor to California Fruit Wrapping Mills, Inc., Pomona, Calif.

Application July 25, 1934, Serial No. 736,916

4 Claims. (Cl. 47—26)

This invention relates to plant protectors, and an object thereof is to provide an inexpensive and strong and durable device of this kind which essentially consists of a spirally rolled sheet of paper of suitable width, stock and tensile strength, which, when unrolled, can be readily set up in a position linearly of a row of plants to protect same from the damaging effect of cold winds and frost and allow for the necessary thinning out and watering of the plants as required, as well as the admission of light and air thereto that will prove conducive to the successful development of strong and perfectly healthy plants.

Another object is to provide a protector consisting of reinforced paper of long length in which the reinforcing means consists of linear spaced apart strips of stiff paper with at least one thereof defining in the sheet a linear line of fold for the lengthwise creasing of the sheet and thus enable one portion of the sheet to be adjusted angularly with respect to an adjacent portion and to occupy a position to protect the plants from the direct glare of the sun and from hard rains.

A still further object is to provide a protector wherein novel and effective forms of tying or fastening devices can be readily embodied in the structure during the manufacture thereof and which can be employed as a means for anchoring the protector to a propping structure when set up for use.

A further object is to provide a protector which can be more conveniently handled than was possible heretofore with protectors of the prior art and which, when not in use, can be compactly rolled up for storage thereof.

With the above and other objects in view, which will appear as the nature of the invention is better understood, the same consists in the improved construction and novel arrangements of parts which will hereinafter be fully described and particularly pointed out in the claims.

In the accompanying drawing has been illustrated a single and preferred form of the invention, it being, however, understood that no limitations are necessarily made to the precise structural details therein exhibited, but that changes, alterations and modifications within the scope of the hereto appended claims may be resorted to when desired.

In the drawing,

Figure 1 is a perspective view of a section or portion of the protector material when unrolled preparatory to the setting thereof to position relatively to a continuous row of plants to be protected;

Figure 2 is a section taken substantially on the the line 2—2 of Figure 1;

Figure 3 is a plan view of a portion of the protector material showing the parts on a somewhat enlarged scale;

Figure 4 is a perspective view showing one mode of using the material;

Figure 5 is a perspective view showing another mode of using the material; and

Figure 6 is an end view of the material showing same rolled spirally.

The invention includes the use of a long strip or sheet of paper of suitable tough stock, color and tensile strength which is normally spirally rolled on itself as shown in Figure 6 of the drawing and which may be unrolled to assume the flat condition shown in Figure 1, and then positioned with respect to a row of plants to an angularly disposed shelter as shown in Figure 4 or the shed-like structure shown in Figure 5.

The paper of which the device is constructed can, of course, be of any suitable width, but in practice and for field purposes or the growing of plants on a commercial scale, same is about thirty inches wide and of sufficient length to enable same to be extended without any interruption along a very considerable length of a row of plants. It is preferably waterproof to render it impervious to moisture and to give same body stiffness, such as will tend to retain the paper from sagging or collapsing when strung into position, flexible linear reinforcing strips of tough grade paper are secured to one side thereof in proximity to the longitudinal edges thereof to protect the long edges of the paper and thereby prevent accidental tearing thereof. These strips are indicated at 1—1 and they may be in the form of gummed strips, which, when moistened on their gummed surfaces, can be firmly secured in position flatwise upon the paper. One or more similar strips 2—2 are secured to the intermediate body portion of the paper and same are disposed in parallel relation to the aforestated strips 1—1. The said strips 2—2 are also spaced apart from each other a suitable distance so as to give the necessary body stiffness to the paper when the paper is adjusted to the form shown in Figure 4 and to give similar body stiffness to the paper when the latter is set up as shown in Figure 5 and to enable one portion of the paper to be adjusted angularly of the other portion. These strips 1—1 and 2—2 are preferably about three fourths of an inch wide and they, too, are preferably water-proofed to prevent same from being torn from the paper when subjected to the effect of moisture. I find it advisable to also secure the said strips to the paper by means of a suitable well-known waterproof adhesive. Secured between the strips 1—1 and the body portion of the paper employed are tying or fastening devices 3. These may consist of cords of suitable length, wire or other material, the free ends of which may be tied to the propping structure so as to firmly anchor the paper to said structure.

When the paper is to be used mostly as a wind break and to some extent as a shelter, as shown in Figure 4, same is strung along a row of plants so as to extend at an angle of about sixty degrees to the ground, at which time one of the long edges of the paper will be in resting engagement with the ground. Because of the wide width of the paper, the opposite long edge thereof will be situated a suitable distance above the plants to more or less protect the plants from the direct glare of the sun, and to also protect the plants from the damaging wind. When the device is used in this manner, props or stakes 4 are driven a suitable distance into the ground so as to take firm positions therein and to enable the paper to be placed flatwise against the props. The tying devices 3 are then wrapped around the adjacent props both at the upper and lower edges of the paper and the device is thus firmly secured in an operative position relatively to the line of plants.

It sometimes is desirable to shelter and protect plants to a somewhat greater extent from the wind, the direct glare of the sun and the rain, and I have shown in Figure 5 how this is provided for. Here it will be observed that the props, which are suitably spaced apart from each other, each consists of two sticks 5—5 which are pivoted together at 6 to provide a substantially inverted V-shaped structure which straddles the row of plants. These sticks are firmly driven into the ground at their lower ends, and the paper is strung along the row at one side of the plants so that a long stretch 7 thereof will be disposed at one side and a short stretch 8 at the other side. Now it will be observed that one of the intermediate tapes is disposed at one side of the vertex of the sticks 5—5 so as to occupy a position at the short stretch side of the paper. It is because of this disposition of the tape 2 that same defines a line of fold in the length of the paper to thus enable the paper to be readily folded to provide the long and short stretches aforementioned. When the paper is folded as aforestated, the tying devices 3 are secured to the sticks to firmly anchor the paper in place. In this use of the paper, both stretches thereof function to protect the plants from the wind, and the short stretch affords more protection from the direct glare of the sun than would result from the use suggested in Figure 4. The short stretch also terminates at an elevation above the ground to permit of free and convenient thinning out of the plants and the "dusting" thereof as desired.

Paper constructed as herein shown and described is quite inexpensive when considering the resulting good that flows from use thereof; the paper is strong and durable and may be used and re-used as often as desired. It can be conveniently rolled into a compact package for shipment and storage and set up quickly and with great ease.

What is claimed is:

1. As a new article of manufacture, a plant protector comprising a spirally rolled sheet of tough stock paper of wide width adapted, when unrolled, to be extended longitudinally of a row of plants at one side thereof with one long edge of the sheet resting upon the ground, and to one side of which sheet, linear reinforcing strips of flexible non-metallic material are secured in positions to protect the long edges of the strip, and means for anchoring the sheet to a propping structure when the sheet is unrolled and extended in the manner aforestated, and comprising lengths of flexible material, each having an end secured between the sheet and an adjacent one of the reinforcing strips and an end projecting from the adjacent long edge of the sheet a sufficient distance to enable same to be tied to the propping structure.

2. As a new article of manufacture, a plant protector comprising a spirally rolled sheet of paper of uniform width throughout which, when unrolled, can be extended longitudinally of a row of plants at one side thereof with one long edge of the sheet resting upon the ground, linear reinforcing strips secured to the sheet longitudinally thereof and spaced apart from each other to enable the sheet to be folded along a longitudinal line at one side of one of the strips so that the sheet will be provided with two angularly disposed stretches, and means carried by the sheet for maintaining angular relationship of the stretches when the sheet is operatively associated with a propping structure, and comprising flexible tying devices each having an end confined between an adjacent one of the strips and the body portion of the sheet and an end projecting beyond an adjacent long edge of the sheet.

3. As a new article of manufacture, a plant protector comprising a roll of paper of uniform wide width and tough texture adapted when unrolled to be vertically disposed at one side of a row of plants and to extend longitudinally thereof, and four or more spaced apart rectilinear flat strips of gummed paper secured flatwise against the sheet at one side thereof and in positions to respectively reinforce the long edges of the sheet and the intermediate portions of the sheet in directions longitudinally thereof, each of said strips having a length which is co-extensive with the sheet.

4. As a new article of manufacture, a plant protector comprising a roll of paper of uniform wide width and tough texture adapted when unrolled to be vertically disposed at one side of a row of plants and to extend longitudinally thereof; and two rectilinear strips of reinforcing paper secured flatwise against one side of the sheet at the respective long edges thereof; and two or more equi-distantly spaced apart similar paper reinforcing strips secured flatwise against the same side of the sheet throughout the length thereof and disposed in parallel relation to said first strips.

JOHN W. GENUIT.